Figure 1:
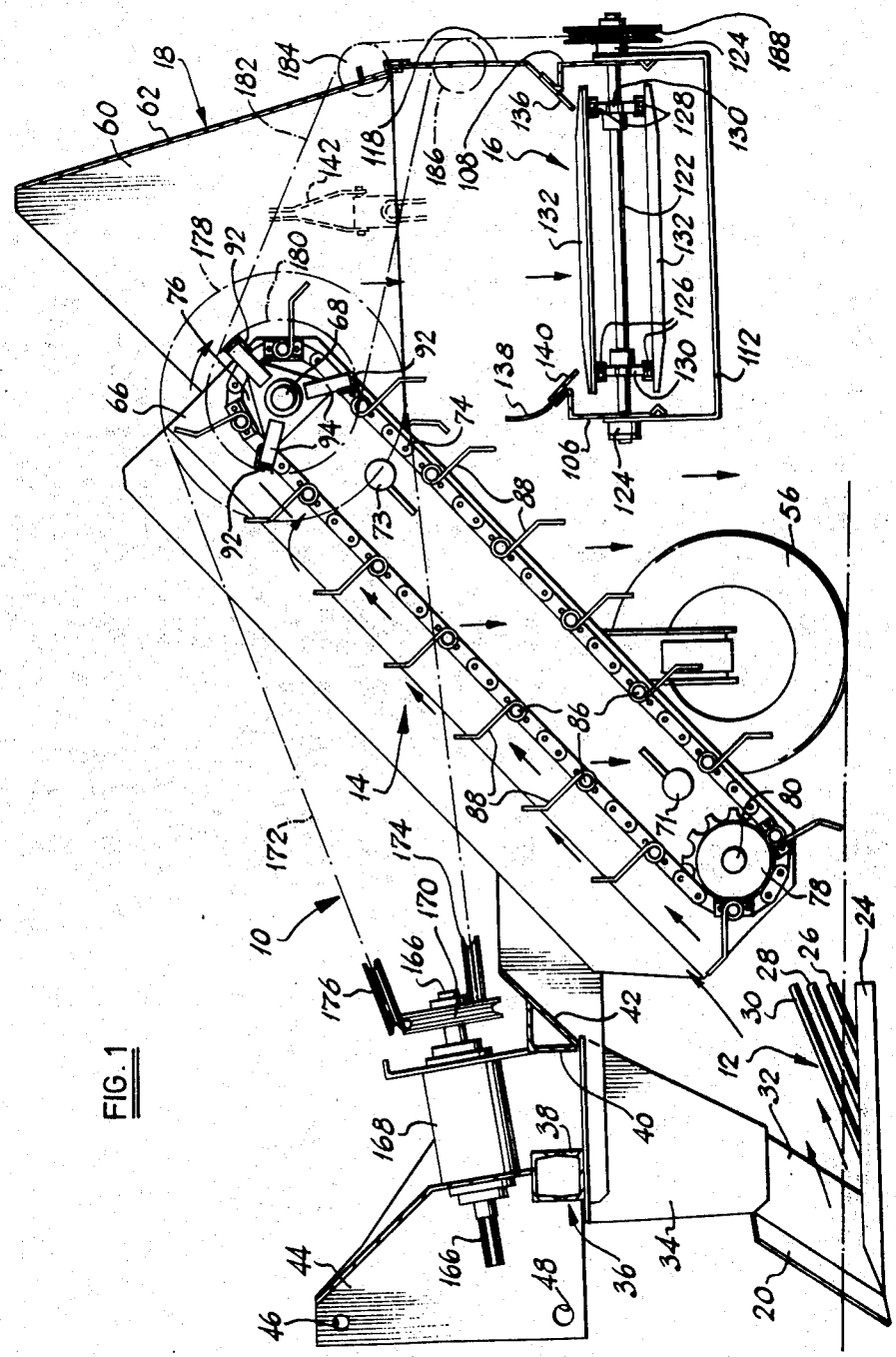
Figure 6:
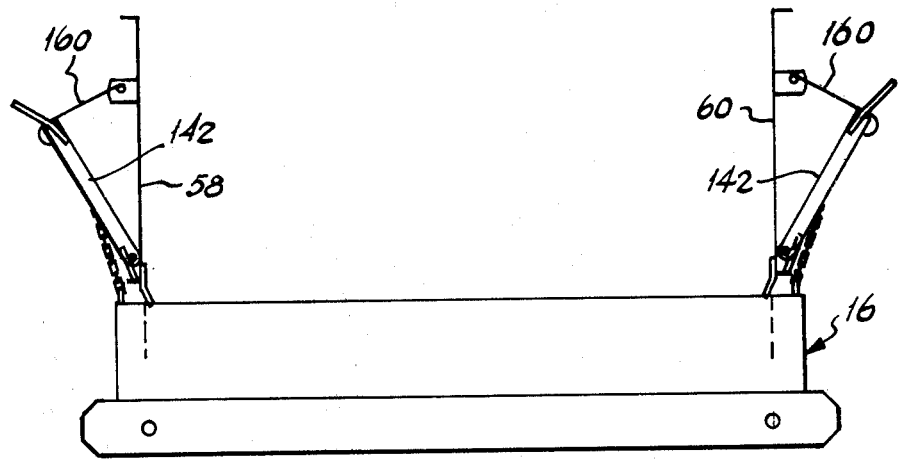
Figure 7:
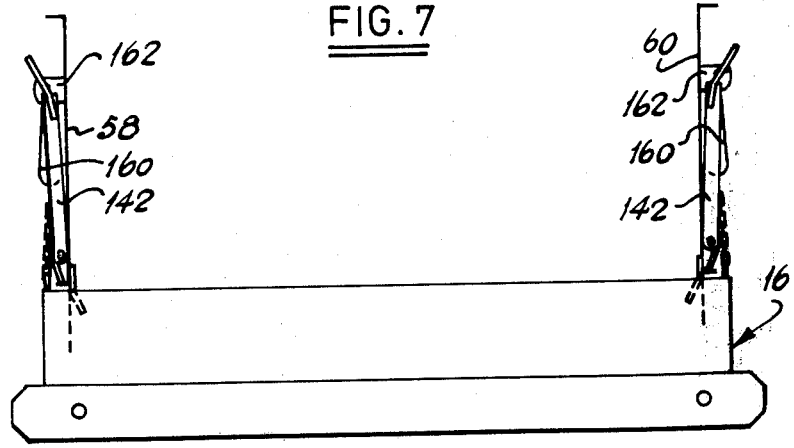

United States Patent [19]

Rodger

[11] 3,976,143

[45] Aug. 24, 1976

[54] WINDROWING APPARATUS FOR PEANUT DIGGER

[75] Inventor: Alexander J. Rodger, Louwskraal, South Africa

[73] Assignee: Slattery Manufacturing (Proprietary) Ltd., Potgietersrus, Transvaal Province, South Africa

[22] Filed: Mar. 7, 1975

[21] Appl. No.: 556,360

[30] Foreign Application Priority Data

Mar. 18, 1974 South Africa.................... 74/1745

[52] U.S. Cl. ............................................. 171/101
[51] Int. Cl.² ........................................ A01D 29/00
[58] Field of Search .......... 171/101, 102, 103, 104, 171/105, 110, 111, 117, 124, 125, 126, 134; 56/370

[56] References Cited

UNITED STATES PATENTS

| | | | |
|---|---|---|---|
| 2,761,270 | 9/1956 | Blaser et al. ........................... | 56/370 |
| 3,260,314 | 7/1966 | Edwards ................................ | 171/101 |
| 3,565,178 | 2/1971 | Whitfield .............................. | 171/45 |

*Primary Examiner*—Russell R. Kinsey
*Attorney, Agent, or Firm*—Robert L. Farris

[57] ABSTRACT

Peanut digging apparatus having a quick-attach side delivery conveyor for the peanut crop. With said conveyor detached, crop can be deposited directly behind the apparatus. With said conveyor attached crop can be deposited at a laterally offset position. Using these two modes of operation successively, large windrows of crop can be built up in stages while allowing time between said stages for natural drying of the crop.

1 Claim, 12 Drawing Figures

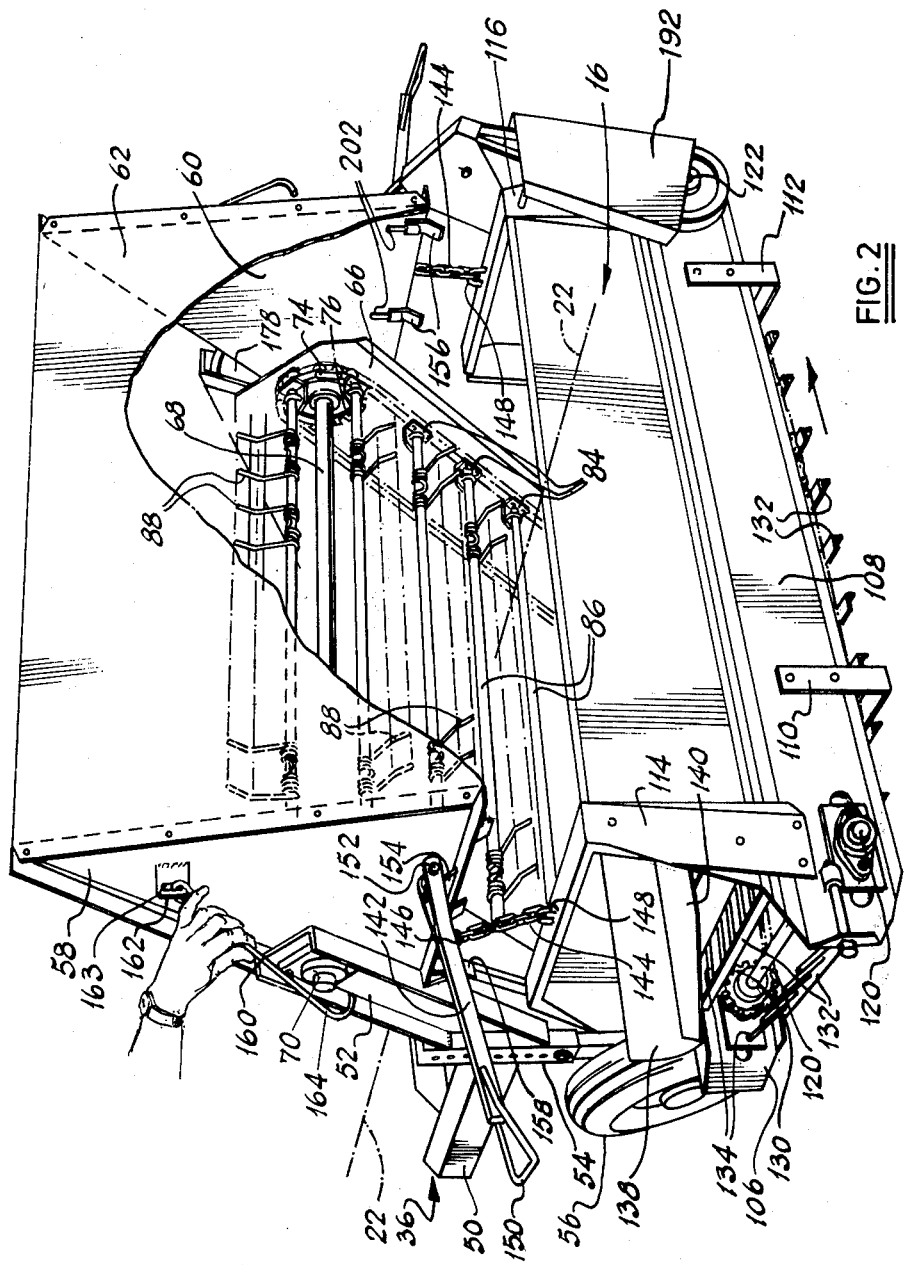

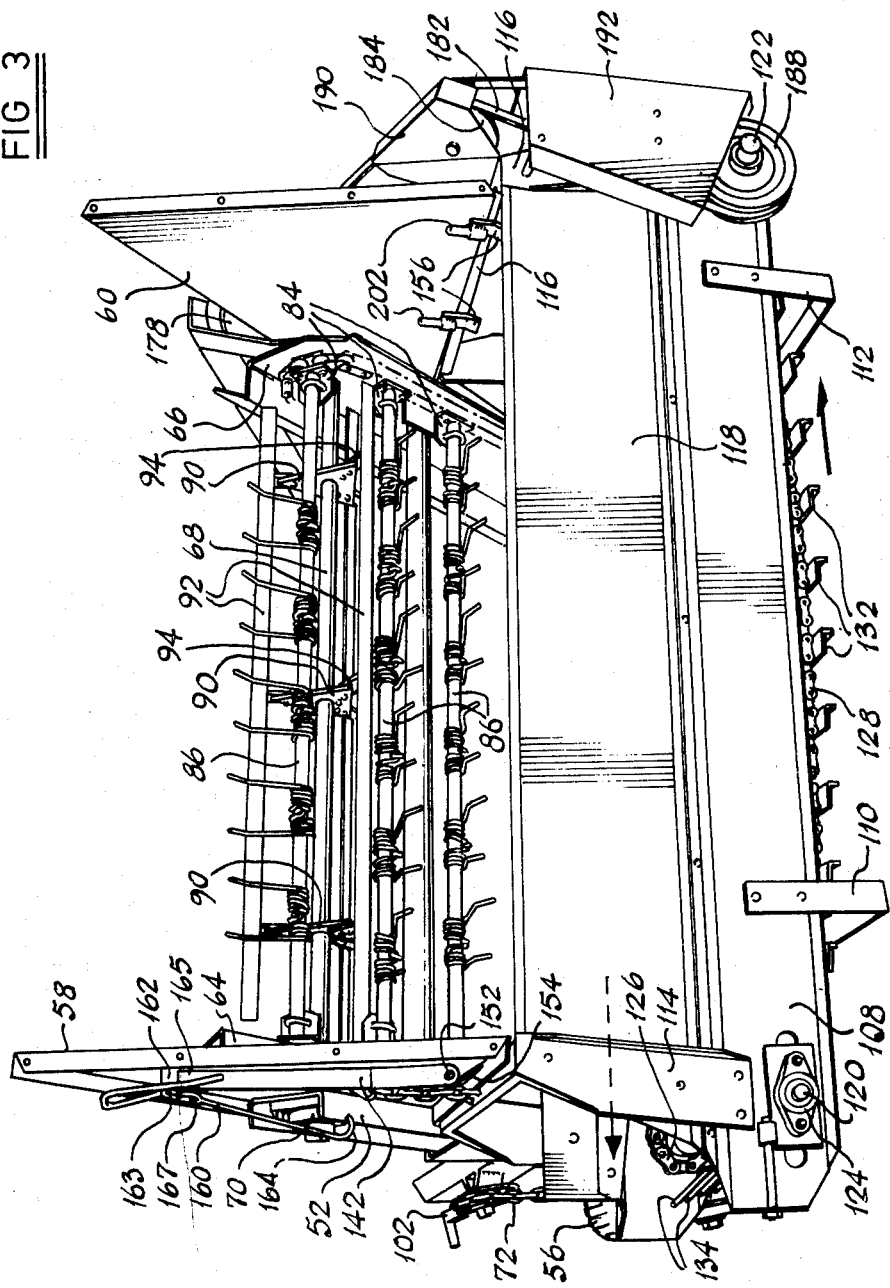

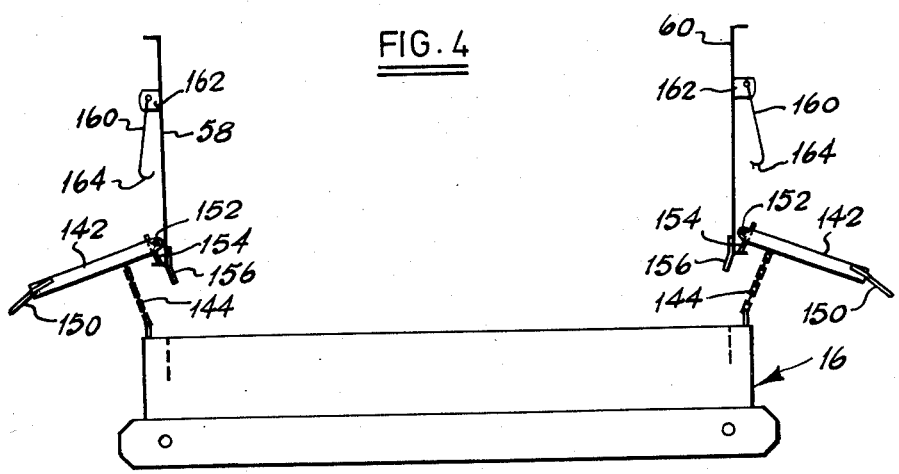
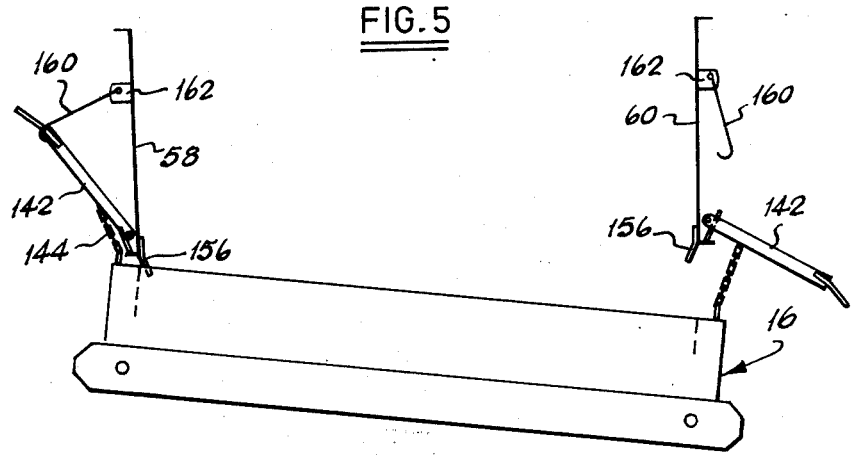

WINDROWING APPARATUS FOR PEANUT DIGGER

This invention relates to peanut digging apparatus and in particular to such apparatus which is adapted to deliver the peanut crop to the ground after the crop has been largely separated from the soil, so as to produce a windrow.

A problem which arises in the design and use of such peanut digging apparatus is to reconcile the conflicting requirements of the drying of the crop and the subsequent efficient picking of the peanuts therefrom by means of a peanut picker or peanut combine.

For efficient utilization of the peanut picking machine the windrow to be gathered by the machine should be large enough to fully load the peanut picking apparatus thereof - e.g. a finger type rotor working against a series of fixed but adjustable spring fingers. However, it is found that a windrow large enough to fully load a modern peanut combine is of such a size that the windrow does not dry efficiently nor uniformly under the natural conditions of wind and sunshine.

It is an object of the present invention to provide means whereby a large peanut windrow may be formed and whereby adaquate drying of the peanut crop of said windrow may be achieved under natural conditions.

According to the invention there is provided peanut digging apparatus comprising: at least one share, said share being operative to lift a peanut crop from the soil; and a soil separating conveyor, said soil separating conveyor being positioned to receive a peanut crop from the share; characterized by a side delivery conveyor and a mounting therefor whereby the side delivery conveyor can be mounted on the apparatus at a position to receive crop from the soil separating conveyor, the side delivery conveyor being operative in said position to convey the peanut crop laterally with respect to the centre line of the apparatus for deposition at an offset position, the side delivery conveyor being quickly removable to permit the crop to be deposited directly behind the apparatus.

The provision of the peanut digging apparatus with a detachable side delivery conveyor allows the digger to be rapidly converted from rear delivery to side delivery and vice versa. Accordingly, some rows of a peanut crop can first be dug and windrowed directly behind the machine (i.e. without the side delivery conveyor) and left to dry. Then, with the side delivery conveyor attached the row or rows of crop adjacent said first dug rows can be dug and deposited on top of the first windrow and left to dry. In this way windrows of 2 or 3 rows (digging one row at a time), or 4 or 6 rows (digging two rows at a time) of peanut crop can be formed i.e. double or triple windrows. In each case the crop material deposited on the ground first is allowed to dry freely under natural conditions and can do so efficiently since its bulk is not unduly large. Then this material is covered by the next layer of crop material. The latter substantially prevents further drying of the first layer of crop material but is able to freely dry itself.

Figure 8:
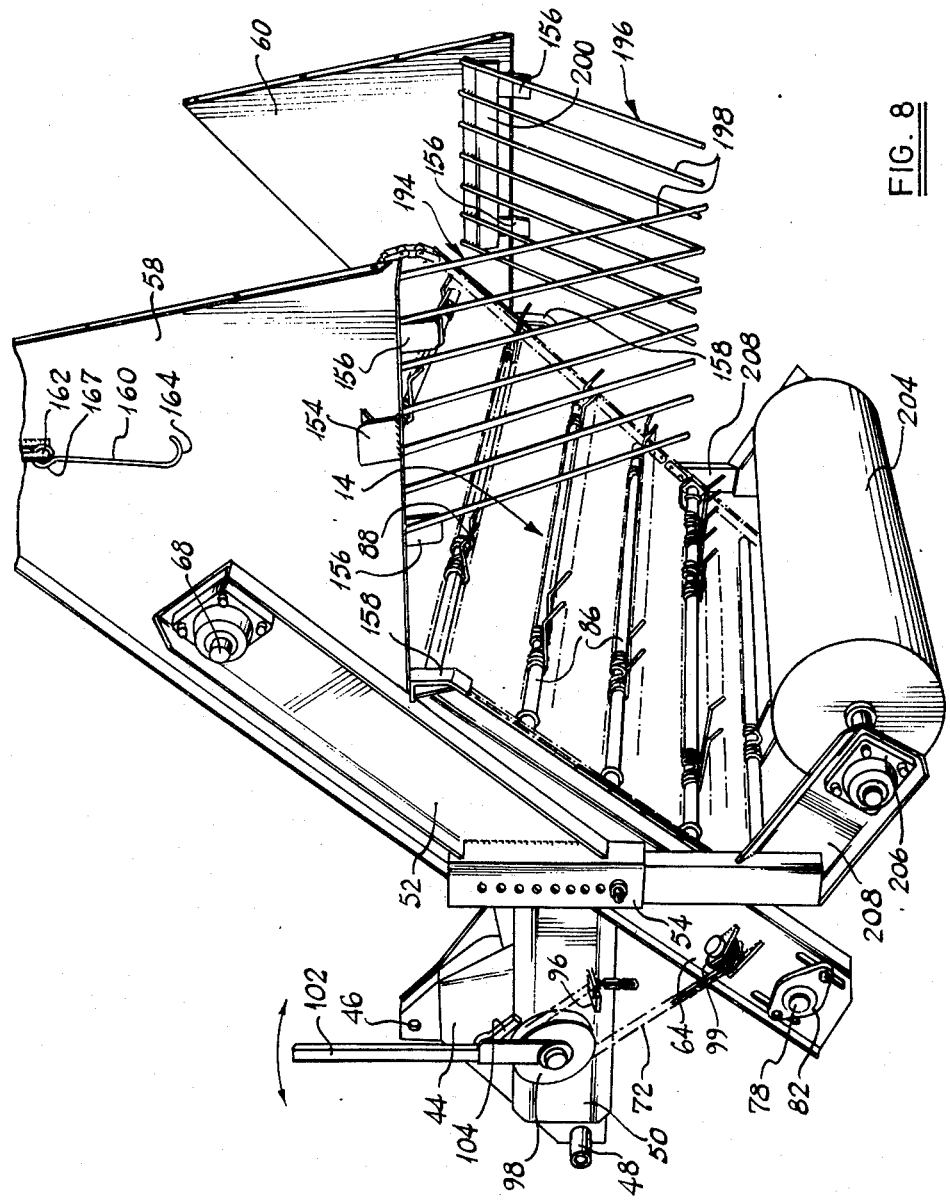

An embodiment of the invention will now be described by way of example with reference to the accompanying drawings in which:

FIG. 1 shows a longitudinal section through peanut digging and windrowing apparatus;

FIG. 2 shows a perspective view with parts broken away from the rear and the left hand side of the apparatus of FIG. 1, showing a side delivery conveyor about to be attached thereto; FIG. 3 shows a perspective view of the apparatus as seen from a position similar to that of FIG. 2 but slightly nearer the centre line of the apparatus, showing the side delivery conveyor fully attached to the apparatus;

FIGS. 4 to 7 show, diagrammatically, four stages in the attachment of the side delivery conveyor to the peanut digging apparatus, as seen from the rear;

FIG. 8 shows, in a perspective view similar to that of FIG. 2, the peanut digging and windrowing apparatus of FIG. 2 with the side delivery conveyor removed and a pair of guide combs substituted therefor, to provide a windrow directly behind the apparatus. The apparatus includes a roller in place of the side wheels of the FIG. 2 embodiment; and FIGS. 9 to 12 are diagrams indicating how the peanut digging apparatus illustrated in the previous Figures can be employed to form 6 row windrows (in the case of FIGS. 9 to 11), and 4 row windrows (in the case of FIG. 12)

As shown in FIG. 1 of the drawings, peanut digging apparatus 10 comprises a pair of transversely spaced crop lifting shares 12, a soil separating conveyor 14, a side delivery conveyor 16 and a mounting 18 for the side delivery conveyor.

Shares 12 may be of any suitable form for digging and lifting a peanut crop. Such shares are well known in the art and do not form part of this invention and the shares are therefore not fully illustrated. As can be seen from FIG. 1 however, each share comprises a coulter 20 or opening portion at the forward end of the share. The coulter extends parallel to the front/rear centre line 22 (see FIG. 2) of the digger and slopes upwards and rearwards. A share portion 24 extends generally horizontally from the coulter towards centre line 22 at an angle of about 25 degrees to said centre line. Three spaced crop lifting rods 26, 28, 30 parallel to centre line 22 extends upwards and rearwards from share portion 24 towards the front end of conveyor 14. Each share 12 further comprises a vertical shank 32 mounted below a heavy steel plate bracket 34 bolted to a transverse frame 36.

Frame 36 comprises a transverse square section beam 38, a transverse angle section 40 welded to a steel plate 42, together with certain fore/aft structural members welded thereto (not seen in FIG. 1) and serves as a chassis for the implement as a whole, Frame 36 carries a forwardly projecting headstock 44 having an upper connector 46 for a tractor top link and two transversely spaced lower connector pins 48 to receive the draught links of a tractor.

Frame 36 further comprises a pair of horizontal chassis members 50 (see FIG. 2), one at each side of the implement, and a pair of upwardly inclined chassis members 52, one at each side of the implement. These chassis members are fixed to a mounting 54 whereby a pair of slightly tilted depth control wheels 56 are secured to the frame so as to be height-adjustable with respect thereto.

The rear end of frame 36 is constituted by a pair of triangular rearwardly-projecting steel plates 58, 60 and a transverse back plate 62 fixed thereto. The back plate is only shown in FIG. 2. In the other drawings it is omitted for illustration purposes. The plates 58 to 62 provide the mounting 18 for side delivery conveyor 16, as will be explained.

Soil separating conveyor 14 will now be described. It comprises a pair of side plates 64 (see FIG. 3), 66 pivotally supported at their upper rear end on a transverse drive shaft 68 journalled in bearings 70 carried by chassis members 52. The lower front end of side plates 64, 66 is adjustably supported by a chain 72 (see FIG. 8) as will be described below. The side plates are rigidly interconnected and formed into a framework by a pair of transverse steel tubes 71, 73 at their lower and upper ends respectively.

A pair of transversely spaced roller chains 74 are trained round sprockets 76, one at each end of drive shaft 68, and around corresponding sprockets 78 one at each end of an idler shaft 80 journalled in position-adjustable bearings 82 at the lower end of side plates 64 and 66.

Chains 74 carry brackets 84 at their inner side edges to support a series of transverse crop conveying rods 86 in a fixed attitude with respect to the particular chain links on which said rods are supported. Each rod 86 has a series of spring tine fingers 88 mounted thereon and projecting outwards therefrom. The fingers serve to lift peanut crop from the crop lifting rods 26, 28, 30 of shares 12 and convey it upwards and rearwards.

Drive shaft 68 has fixed thereto three transversely-spaced triangular plates 90 which serve to support three angle-section rotary crop feeding bars 92 which are supported at positions just clear of the apices of said plates by means of three oblong rectangular plates 94 welded therebetween. The feeding bars are jusst shorter than the distance between sprockets 76 so as to rotate freely therebetween.

The forward and lower end of soil separating conveyor 14 is supported, as shown in FIG. 8, from chassis members 50 by chain 72. The chain extends from a notched plate 96 fixed to member 50 around a first pulley 98 mounted for rotation on chassis member 50, round a second pulley 99 journalled on side plate 64 of conveyor 14, through an opening in said side plate, through transverse tube 71 extending between the side plates 64, 66, round a third pulley (not seen) corresponding to pulley 99 and is anchored to the chassis member 50 (not shown) on the right hand side of the implement.

A hand lever 102 having a sprag 104 freely pivoted thereon for engagement with chain 72 is itself freely pivoted on pulley 98 for angular movement to enable the height of the front end of conveyor 14 to be adjusted relative to the shares 12 in a manner to be described later.

As shown in FIGS. 1 to 3, side delivery conveyor 16 is built around a framework comprising a pair of side plates 106, 108 connected underneath by a pair of U-shaped stand members 110, 112, and connected above by a pair of generally U-shaped pressed steel frame members 114, 116. The frame members are themselves connected by a panel 118 which prevents rearward escape of peanut crop.

The conveyor itself comprises a pair of shafts 120, 122 parallel to centre line 22, journalled in bearings 124 carried by side plates 106, 108 at each end of the side plates. A pair of conveyor chains 126, 128 are trained round sprockets 130 which are provided one at each end of each of the shafts 120 and 122. The conveyor chains carry angle-section slats 132 extending between the chains and parallel to centre line 22. As shown in FIGS. 2 and 3 the slats each have welded thereto a series of crop carrying fingers 134 which each extend in the trailing direction from their respective slats with respect to the direction of movement of said slats.

To guide crop onto the slats 132 and their fingers 134, panel 118 is formed with an inwardly sloping flange 136 at its lower edge. A corresponding flange comprising a rubber sheet strip 138 and a metal reinforcing strip 140 rivetted thereto is mounted on side plate 106 at the other side of the conveyor.

The means whereby side delivery conveyor 16 is mounted on the implement will now be described. Said means is of such a nature that one person (i.e. the tractor driver) can, without assistance, easily attach and detach the conveyor in a very short time.

As shown in FIG. 2, lifting means is provided at each end of the side delivery conveyor. The lifting means comprises a lever arm 142 and a tension member in the form of a chain 144 extending between connectors 146, 148 on the lever arm and on the conveyor framework respectively.

Each lever arm 142 has a handle 150 at one end and a pivot pin 152 fixed to its other end. The pivot pin is locatable in one of a pair of V-shaped brackets 154 welded one on each of the steel plates 58, 60 at approximately the mid point along the horizontal lower edge thereof. Brackets 154 constitute pivot points for the lever arms and provide a U-section bearing member on which pivot pin 152 seats. The lever arms allow the conveyor to be easily raised from the ground into its operating position on the implement. Two inclined guide members 156 are welded to each of the triangular steel plates 58, 60 for engagement with frame members 114, 116 to guide the conveyor into the correct position laterally i.e. with respect to centre line 22, as the conveyor is raised. Two further guide members 158 are welded to frame 36 one at each side of the implement to guide the conveyor into the correct position longitudinally, as the conveyor is raised.

Retaining means for lever arms 142 are provided in the form of rods 160 which are freely pivoted in a vertical slot 163 in each of two brackets 162 welded to triangular plates 58, 60. The rods are each provided with a formation in the form of a hook 164 at their free outer ends for engagement with the lever arms to hold said arms in a position intermediate their fully raised and fully lowered positions as will be described. Brackets 162 fit within a bifurcated end portion 165 of each lever arm 142 so that a loop 167 at the inner end of each rod 160 can retain the lever arm in its fully raised position.

The main features of the drives for soil separating conveyor 14 and side delivery conveyor 16 are shown in FIG. 1. A splined drive input shaft 166, which is connectible by a conventional shaft (not shown) and universal joints to the power take off shaft of a tractor, is journalled in a housing 168 bolted to frame 36 on centre line 22. A vee belt pulley 170 mounted at the other end of shaft 166 drives a vee belt 172 trained round a pair of tensioning and guiding pulleys 174, 176 at the right hand side of the implement. Vee belt 172 extends round a drive input pulley 178 for conveyor 14, said input pulley being fixed to drive shaft 68. Drive for side delivery conveyor 16 is obtained from shaft 68 through a vee belt pulley 180 fixed thereto. An associated vee belt 182 is trained round pulley 180, a fixed guide pulley 184, an adjustable guiding and tensioning pulley 186, and a drive input pulley 188 fixed to shaft 122. Pulley 184 is mounted on a bracket 190 fixed to frame members 116 of conveyor 16. Belt 182 and part of pulley 188 are shielded by a sheet metal guard 192 also mounted on frame member 116.

Adjustable pulley 186 is mounted on conveyor 16 so as to be adjustable in position up and down a vertical slot (not shown). Any suitable known means may be employed for this purpose. Such mechanisms are well known and it is therefore believed that there is no need to illustrate this feature. Suffice it to say that a lever arm is provided whereby a large belt-tensioning force may be easily applied manually to the pulley. An easily operable screw threaded locking means (not shown) is provided to lock pulley 186 in any desired adjusted position.

When side delivery conveyor 16 has been detached from the implement, as will be described, a pair of detachable guide combs 194, 196 are substituted therefore — see FIG. 8. Each comb comprises a series of rods 198 welded to a support 200. Each support has a pair of sockets (not shown) to receive a pair of upstanding spigots 202 (see FIGS. 2 and 3) fixed to guide members 156 on plates 58, 60 whereby the comb is detachably mounted in position.

The two sets of rods 198 slope downwards towards each other and define a gap between the combs through which crop is deposited on the ground directly behind the implement — as will be described.

It will be noted that in FIG. 8, the peanut digger is shown fitted with a roller 204 in place of the wheels 56. The roller is carried, height adjustably, on mounting 54 in generally the same manner as the wheels 56. The roller is journalled in bearings 206 carried on cranked support posts 208 received in mountings 54. The roller is used in place of wheels 56 on certain soils where it is desirable to make a smoother bed to receive the windrow so as to facilitate subsequent pick-up of the windrow by a peanut combine.

Use of the peanut digger will now be described.

When not in use, the implement rests on the ground on shares 12 and ground wheels 56 (or roller 206). The implement is mounted on a tractor by attaching headstock 44 to the tractor's hitch links in the usual way.

It will be assumed first that side delivery conveyor 16 is not attached to the implement and that the implement is to be used in the form shown in FIG. 8 to produce windrows directly behind it.

Accordingly, to commence digging, the tractor links are lowered and shares 12 enter the soil. The implement is positioned so as to straddle two rows of peanuts and to dig the two rows simultaneously. The crop is raised by the shares and fed by the crop lifting rods 26, 28, 30 to the forward end of soil separating conveyor 14. The fingers 88 of that conveyor lift the crop and feed it upwards and rearwards as a continuous mat while at the same time agitating the crop so as to allow soil to fall back to the ground.

At the rear end of conveyor 14 the crop is discharged rearwards by the crop feeding bars 92 and dropped onto the comb assemblies 194, 196 which centralize the crop so that it falls onto the ground as a well-defined windrow directly behind the implement.

In order to change the penetration of shares 12, wheels 56 or roller 202 are raised or lowered with respect to the frame 36 of the implement. After such adjustment, the height of the front end of conveyor 14 should be adjusted to ensure efficient crop pick-up by fingers 88 or to avoid said fingers digging into the ground. To raise the conveyor, sprag 104 is engaged with a link of chain 72 and hand lever 102 is pulled rearwards, thereby tightening the chain, until the appropriate link of the chain can be inserted into the slot in bracket 96 to lock the conveyor in position again. To lower the conveyor, the chain is first tensioned by means of the hand lever as before, then after releasing the chain from bracket 96, the appropriate link is inserted in the slot in the bracket and the hand lever is allowed to move forwards so that the weight of the conveyor is supported by the bracket again.

When it is desired to deliver crop to one side of the implement, comb assemblies 194 and 196 are first detached by simply raising them manually from spigots 202. The implement is then positioned over the side delivery conveyor 16 (see FIGS. 2 and 4), by appropriately manoeuvring the tractor. At this stage conveyor 16 is resting on the ground and the peanut digger is supported by the tractor.

The sequence of operations whereby conveyor 16 is mounted on the implement will now be described by reference to FIGS. 4 to 7.

The sequence is:
1. locate pivot pin 152 of one of the lever arms 142, in its V-shaped bracket 154 (see left hand side of FIG. 4);
2. raise the lever arm to its intermediate position and use rod 160 to retain it in that position (see left hand side of FIG. 5);
3. repeat 1. and 2. above for the other lever arm 142 (see FIGS. 5 and 6);
4. move one of the lever arms to its fully raised position in which bracket 162 has entered the bifurcated end 165 of said lever arm (see FIGS. 3 and 7) and lock the arm in this position by allowing loop 167 of retaining rod 160 to rest in the bottom of the vertical slot 163 in bracket 162;
5. repeat 4. above for the other lever arm (see FIG. 7);
6. fit vee belt 182 over drive pulleys 180 and 188 and around guide pulleys 184 and 186 and tension the belt by adjusting pulley 186.

The implement is now ready to deposit windrows at the left hand side of the row from which the windrow material has been dug. In use, all the crop material falls onto side delivery conveyor 16 and is carried laterally by fingers 134 and released at the discharge end of the conveyor. As can be seen in FIG. 3, the fingers 134 turn as they pass round end sprocket 126 and effectively flip the material leftwards to assist discharge. This effect together with the rate of lateral movement of slats 132 and fingers 134 as determined by the rate of rotation of the tractor's p.t.o. shaft is sufficient to deposit the windrowed material at a position spaced a distance of two row widths from the centre line of the implement.

Figure 9:
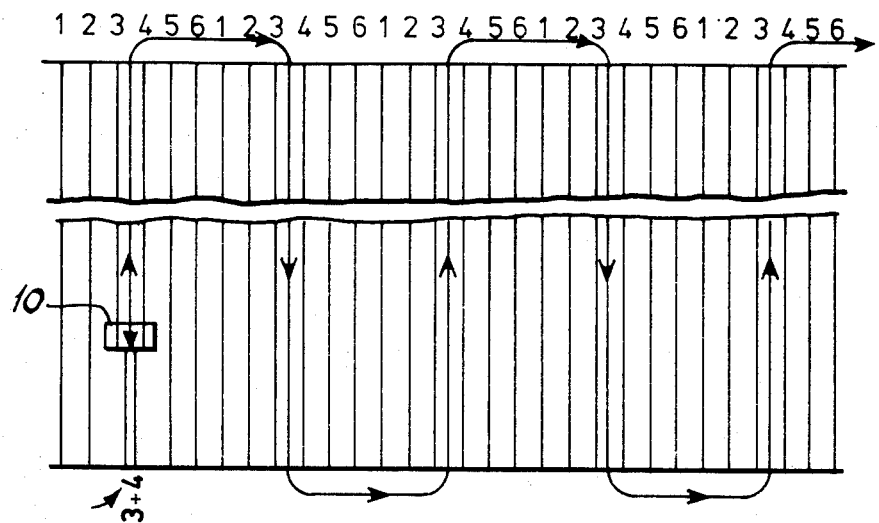
Figure 10:
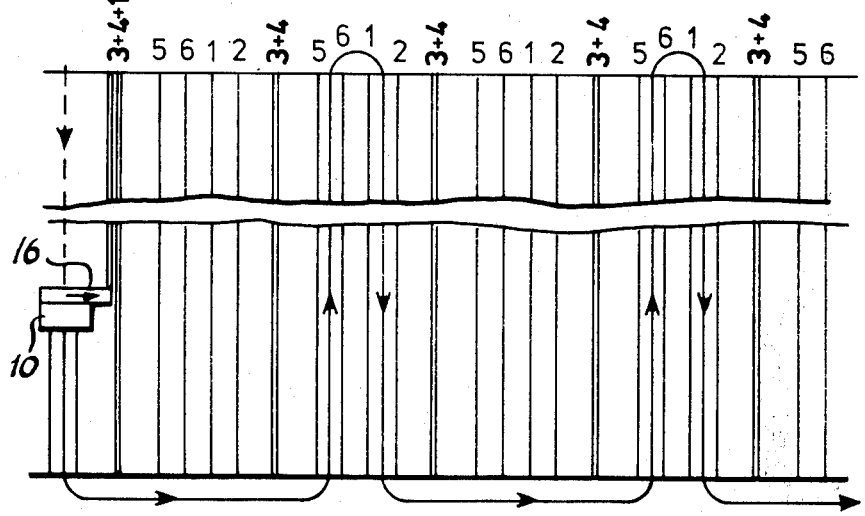
Figure 11:
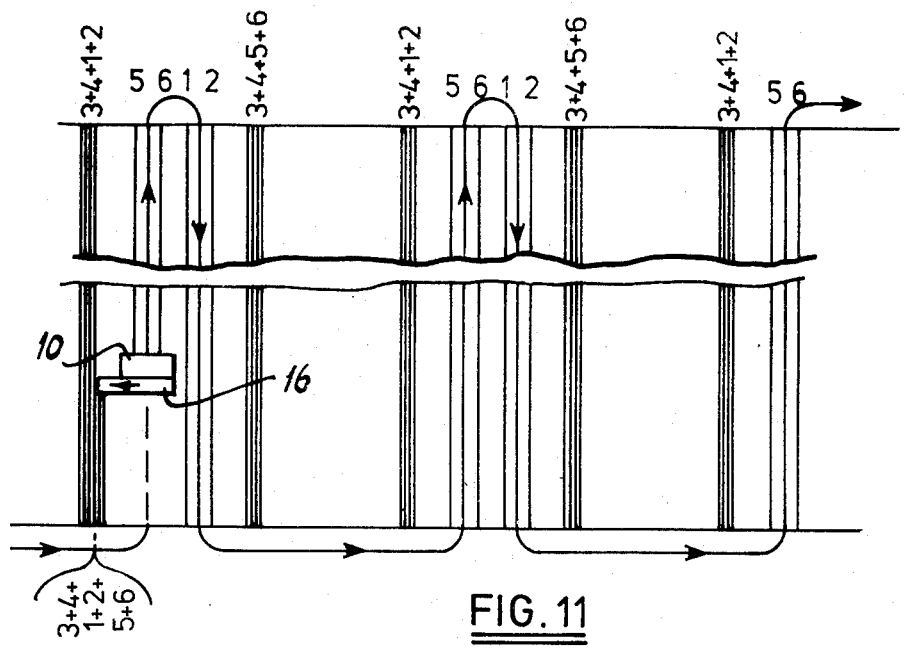

The method whereby the implement can be used to form windrows consisting of the crop material from 6 rows of peanuts will now be described with reference to FIGS. 9, 10 and 11. The method comprises the following steps:
1. using the windrower without the side delivery conveyor, every third pair of rows of crop are dug and windrowed — as shown in FIG. 9. If the rows are numbered from 1 to 6 as shown in FIGS. 9 to 11, this means that all rows numbered 3 and 4 are dug and windrowed;
2. the windrows formed in 1. above are allowed to dry under natural conditions of sunshine and wind;
3. using the windrower with the side delivery conveyor, one more layer of crop is then deposited on top of the existing windrows from the rows of crop at one side of these windrows. As shown in FIG. 10, this is achieved by digging two adjacent pairs of rows numbered 5, 6, 1, 2, leaving the next two pairs of rows so numbered, digging the following two pairs of rows so numbered — and so on;

4. the larger windrows formed in 3 above are allowed to dry under natural conditions of sunshine and wind. During such drying the crop material from rows 3 and 4 is protected and undergoes little further drying; and 5. again using the windrower with the side delivery conveyor, a final layer of crop is deposited on top of the double windrows formed in stage 3. above, from the rows of crop at the other side of these windrows. As shown in FIG. 11, this is achieved by digging the rows numbered 5, 6, 1 and 2 which were not lifted and windrowed in stage 3. above.

Figure 12:
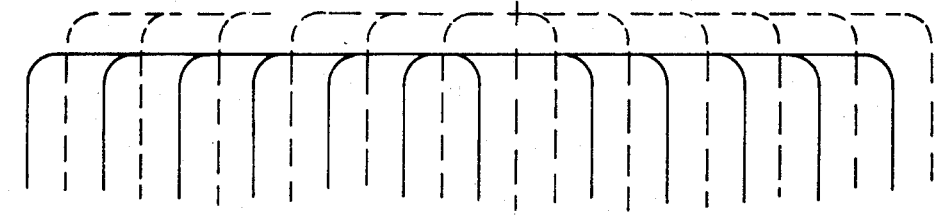

The method of forming 4 row windrows is illustrated in FIG. 12. In FIG. 12, the full lines represent passes through the field with rear delivery of crop and dotted lines represent passes with side delivery. The numbers from 1 to 25 at the top of the drawing each indicate a pair of rows of peanut crop. The passes through the field are numbered in sequence and accordingly it will be seen that 25 passes are required to dig and windrow all the crop in the portion of the field covered by the drawing.

The steps in the method are:
1. follow the path indicated in full lines (passes 1 to 12) with rear delivery of crop;
2. allow the windrows to dry;
3. follow the path indicated in dotted lines (passes 13 to 25) with side delivery of crop;
4. allow the larger windrows so formed, to dry. During such drying the crop material deposited in step 1 undergoes little further drying.

The principal advantages provided by the embodiment of the invention described above are as follows:
1. the ability of the peanut digger to form large windrows in stages, whereby efficient drying of the crop under natural conditions between said stages can be achieved;
2. the method of attaching and detaching the side delivery conveyor whereby one person can, without assistance, attach or detach the conveyor in about 3 minutes without the use of any special tools;
3. the simple and inherently rugged and reliable nature of the implement.

Among modifications which could be made in the above embodiment without departing from he scope of the invention are:
A. the provision of lifting means for lifting only one row, or more than two rows of crop at once;
B. delivery by the side delivery conveyor to the right hand side of the implement;
C. provision of means to selectively deliver crop to either side of the implement e.g. by providing a reversible drive for the side delivery conveyor;
D. provision of an elongated or extensible side delivery conveyor or a high speed crop conveyor to deliver crop a greater distance laterally of the implement than in the above described embodiment.
E. the use of other windrowing patterns than those shown in FIGS. 9 to 12. In those Figures the patterns minimize unproductive travel by the windrower and tractor, but other patterns can easily be devised which may be better adapted to suit conditions on any particular farm or field.

I claim:
1. A peanut digging apparatus including a frame; hitch means mounted on the frame for attaching the peanut digging apparatus to a tractor; at least one share mounted on the frame for lifting a peanut crop from the soil; a soil separating conveyor mounted on the frame to the rear of said one share for receiving peanut crop material from said one share, for conveying peanut crop material up and to the rear, and for separating soil from the peanut crop material; a side delivery conveyor removably connected to the frame by mounting means for receiving peanut crop material from the soil separating conveyor, for conveying the peanut crop material toward one side of the machine and for discharging the crop material to the ground; said mounting means including guide members and cooperating guide surfaces on the lower rear portion of the frame and the upper portion of the side delivery conveyor which laterally and longitudinally position the side delivery conveyor and permit vertical movement of the side delivery conveyor relative to the frame, and lifting means for moving the side delivery conveyor vertically up into engagement with the bottom portion of the frame and holding means holding the side delivery conveyor in position adjacent the bottom portion of the frame; and drive means for driving the separating conveyor and the side delivery conveyor.

* * * * *